June 2, 1953   R. B. SAALFRANK   2,640,425
STROKE ADJUSTMENT DEVICE
Filed Oct. 3, 1950   8 Sheets-Sheet 1

INVENTOR
Royal Bartlett Saalfrank.
BY
ATTORNEYS

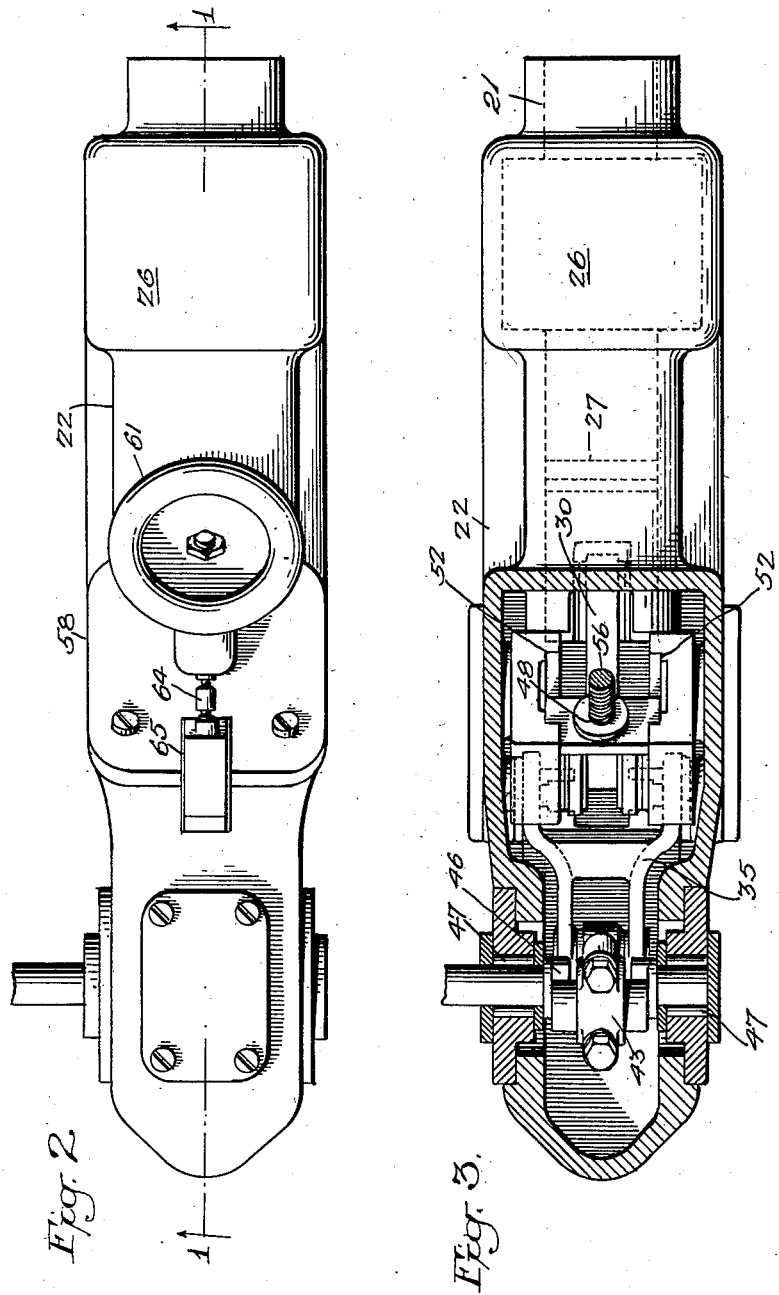

June 2, 1953 — R. B. SAALFRANK — 2,640,425
STROKE ADJUSTMENT DEVICE
Filed Oct. 3, 1950 — 8 Sheets-Sheet 3
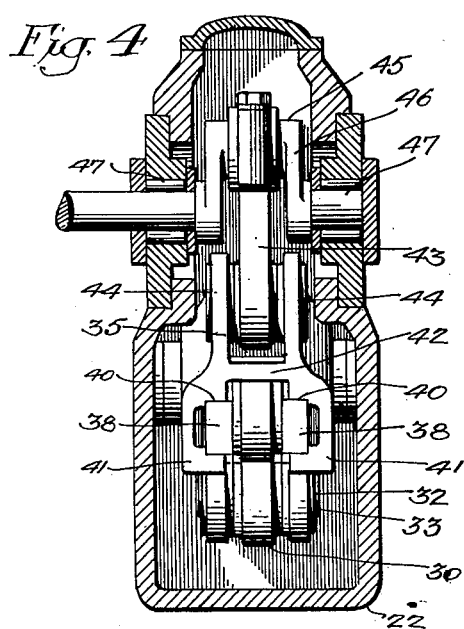
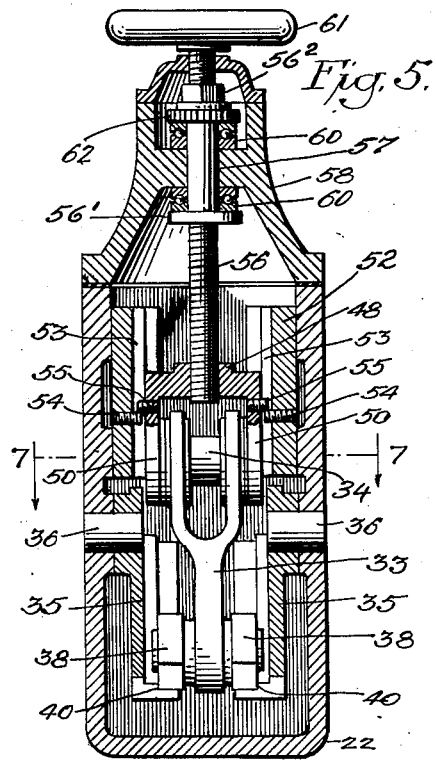
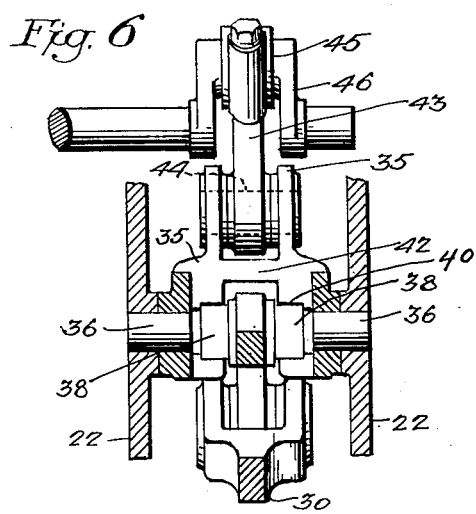
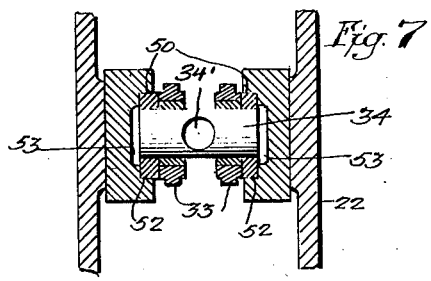
INVENTOR
Royal Bartlett Saalfrank.
BY
ATTORNEYS June 2, 1953 R. B. SAALFRANK 2,640,425
STROKE ADJUSTMENT DEVICE
Filed Oct. 3, 1950 8 Sheets-Sheet 4

INVENTOR
Royal Bartlett Saalfrank.
BY
ATTORNEYS

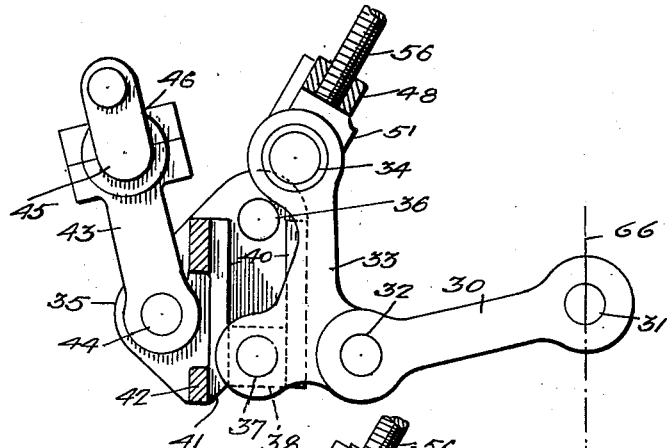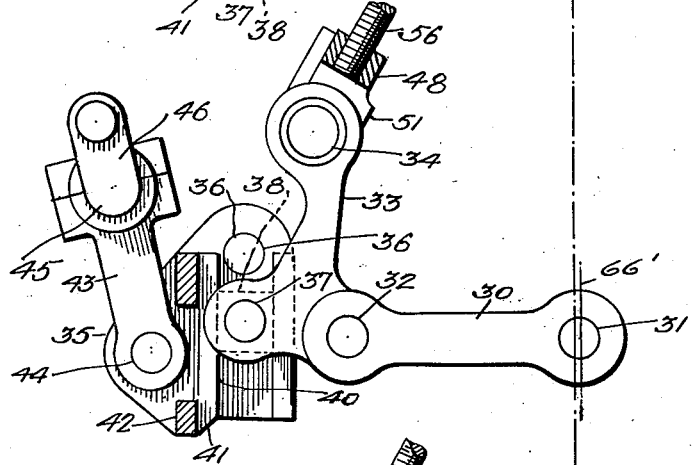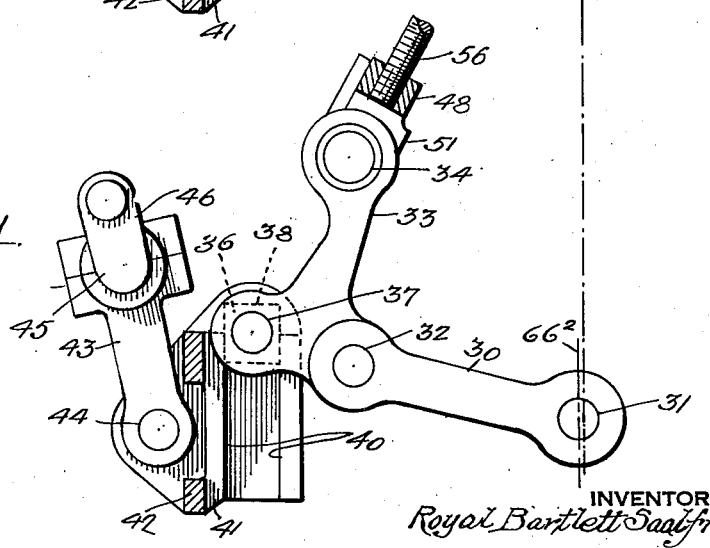

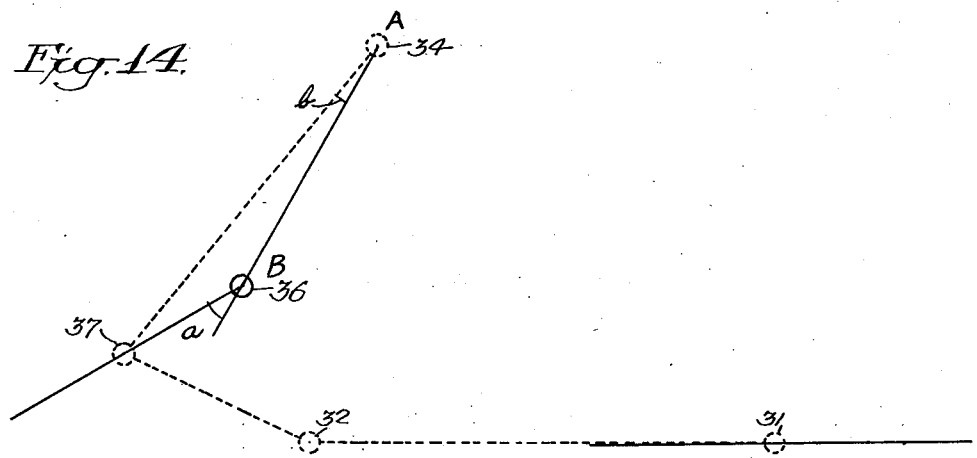
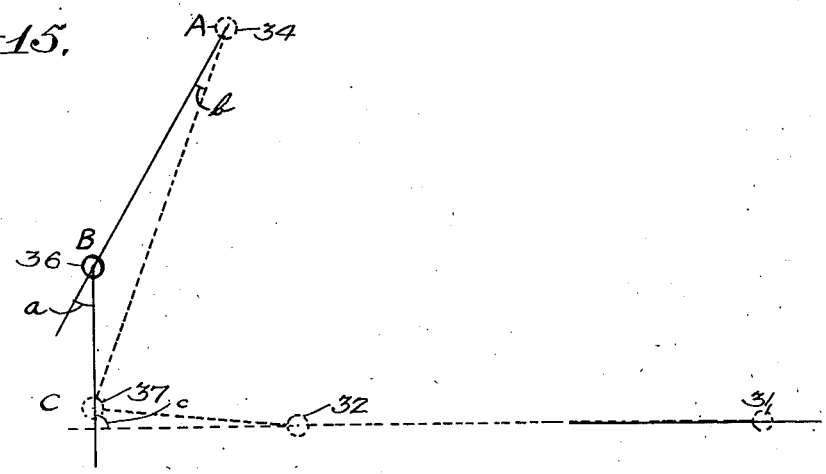

INVENTOR
Royal Bartlett Saalfrank.
BY
ATTORNEYS

Patented June 2, 1953

2,640,425

UNITED STATES PATENT OFFICE 2,640,425

STROKE ADJUSTMENT DEVICE

Royal Bartlett Saalfrank, Gulfport, Fla., assignor to Milton Roy Company, Philadelphia, Pa., a corporation of Pennsylvania Application October 3, 1950, Serial No. 188,147

9 Claims. (Cl. 103—38)

The present invention relates to reciprocating pumps and particularly to stroke adjustment devices therefor.

A purpose of the invention is to accomplish stroke adjustment merely by longitudinal movement of a sliding element which is free from rocking motion.

A further purpose is to avoid the difficulty of stroke adjustment on a swinging pivot by providing for reasonably accurate stroke adjustment along a stationary line of adjustment.

A further purpose is to accomplish direct proportion between change in adjustment and change in stroke, and preferably to make a change in stroke which exactly or substantially corresponds with the change in adjustment.

A further purpose is to read the variation in stroke directly by counting the revolutions of an adjustment screw which changes the stroke.

A further purpose is to avoid error due to compressibility in the liquid by bringing the piston substantially to the same position at the end of the stroke for each of a wide variation of stroke lengths between zero stroke and full stroke.

A further purpose in a stroke control mechanism for a pump having a reciprocal plunger pivotally connected to a connecting rod, is to pivotally connect an adjustment rocker to the opposite end of the connecting rod from the plunger, to mount an adjustment pivot for the adjustment rocker to one side of the axis of the plunger and preferably to one side of the line of the connecting rod pivots, to swing an adjustment block back and forth, to pivot the adjustment block on a fixed pivot located nearer the axis of the plunger and nearer the line of centers of the connecting rod than the adjustment pivot, to pivotally interconnect the adjustment block and the adjustment rocker by a sliding pivot slidable in the adjustment block and preferably located at a point remote from the adjustment pivot and adjoining the pivotal connections of the connecting rod with the adjustment rocker on the side of the adjustment rocker remote from the connecting rod, to make the sliding pivot adjustable along the line of centers between the sliding pivot and the fixed pivot toward and away from the said fixed pivot and to a position coinciding with said fixed pivot in one position of the preferred embodiment, and to swing the adjustment block back and forth equally on opposite sides of the line of centers between the adjustment pivot and the fixed pivot of the adjustment block.

A further purpose is to make the adjustment pivot adjustable in guides extending in the direction of the line of centers between the adjustment pivot and the fixed pivot of the adjustment block.

A further purpose is to make the adjustment on a line equidistant from the start and finish positions of the parts swinging on the adjustment pivot.

A further purpose is to have the sliding pivot at the end of the stroke substantially on the same line perpendicular to the plunger axis for any adjustment position.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a longitudinal vertical section of the pump of the invention, the section being taken on the line 1—1 of Figure 2 omitting part of the liquid end of the pump.

Figure 1ª is a fragmentary variation of Figure 1.

Figure 2 is a top plan view of the structure of Figure 1.

Figure 3 is a top plan view of Figure 1 partially in horizontal jump section, the housing being sectioned on the line 3—3 of Figure 1.

Figure 4 is a vertical section of Figure 1 on the line 4—4 illustrating the driving end of the adjustment mechanism.

Figure 5 is a generally vertical section of Figure 1 on the line 5—5, showing the adjustment screw, and adjustment block and rocker.

Figure 6 is a fragmentary section on the line 6—6 of Figure 1 through the fixed pivot of the adjustment block.

Figure 7 is a fragmentary section on the line 7—7 of Figure 5.

Figures 9 to 11 are partially diagrammatic fragmentary position views showing the end of the compression stroke, respectively for full stroke in Figure 9, half stroke in Figure 10 and zero stroke in Figure 11.

Figures 12 to 16 inclusive are diagrammatic views of the positions of the operating parts for different stroke adjustments and different positions.

Figure 12:
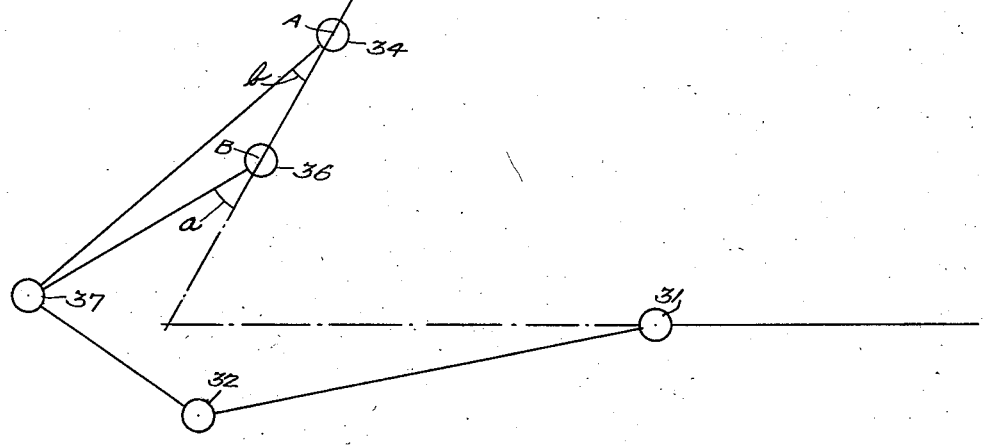
Figure 13:
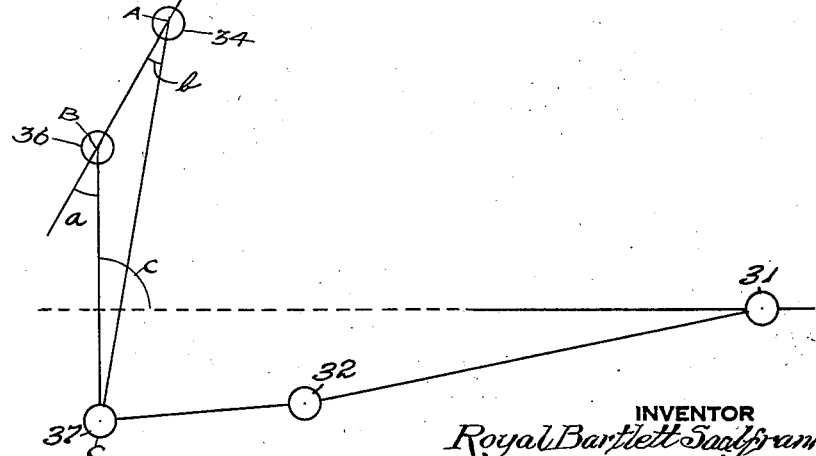

Figure 12 illustrates the beginning of the stroke for full stroke adjustment and Figure 13 shows the end of the stroke for full stroke adjustment.

Figure 14 shows the beginning of the stroke and Figure 15 shows the end of the stroke both for half stroke adjustment.

Figure 16:
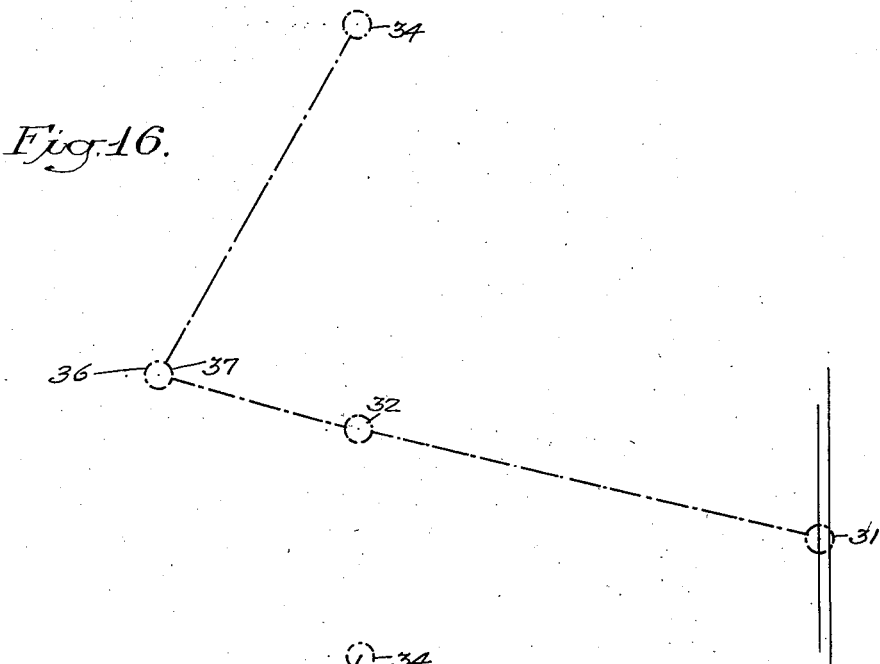

Figure 16 shows the beginning and the end of the stroke for zero stroke.

Figure 17:
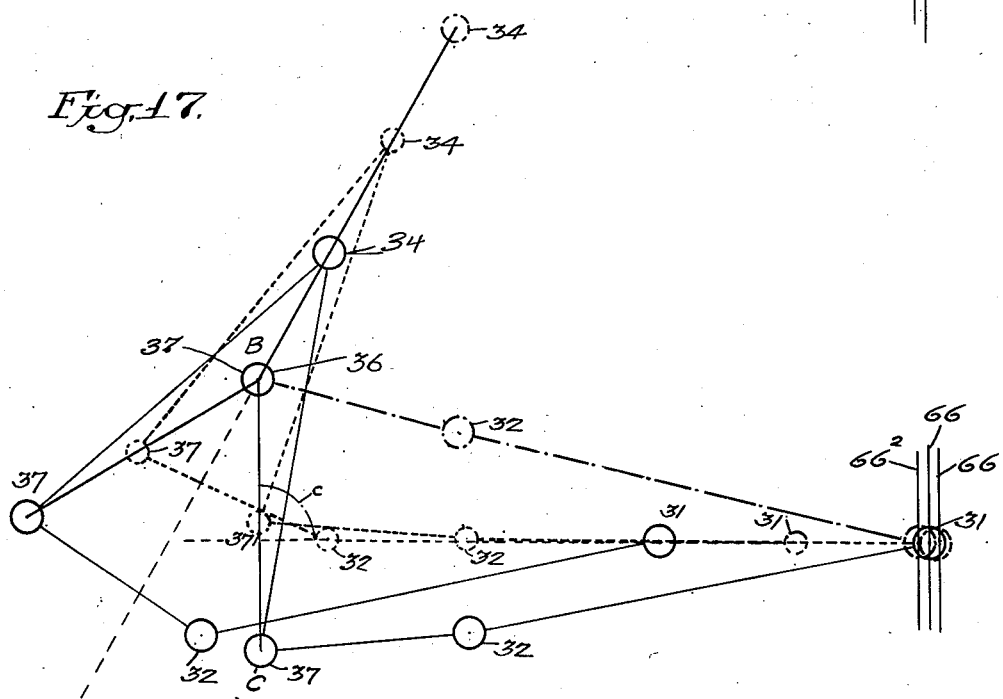

Figure 17 is a diagrammatic view of the composite adjustment and pump positions for full stroke, half stroke and zero stroke, at the beginning and end of the stroke, showing the full stroke in full lines, half stroke in dotted lines and zero stroke in dot-and-dash lines.

Like numerals refer to like parts throughout.

Describing in illustration but not in limitation and referring to the drawings:

In the prior art efforts have been made to provide a stroke adjustment for a reciprocating pump such as a piston pump in which the relationship between the amount of adjustment and the change in stroke will be linear, that is, a given distance of adjustment will provide a given distance of change of stroke. Such prior art mechanisms have been seriously complicated by the fact that it has been necessary in such cases to adjust a pivot along a member which is itself swinging, so that special and complicated mechanism has been required to make the adjustment. In many of such prior art devices, it was necessary to stop the pump in order to accomplish the adjustment. This is not required in the device of the invention.

A further difficulty encountered in the prior art has been that the end of the stroke has varied in different adjustment positions of the pump, so that in pumping liquids having substantial compressibility at relatively high pressures, an error has been introduced.

In accordance with the present invention, pumping is adjusted during the operation of the pump by moving a pivot which is fixed except for its linear motion and rotation, and therefore can be moved very simply. In addition, the pump always completes its stroke at approximately the same point for any adjustment, so that very little error is introduced in pumping compressible liquids even at high pressures. Therefore the pump of the present invention is very effective in scavenging the cylinder regardless of the adjustment position.

The detail of the liquid and of the pump is not important in the present invention, but may desirably conform with Milton Roy Sheen U. S. Patents No. 2,263,429, granted November 18, 1941, for Pump and No. 2,367,893, granted January 23, 1945 for Liquid Pumps. Accordingly no effort is made in the present showing to illustrate the pair of inlet check valves in series and the pair of outlet check valves in series which will be used to connect to the pump chamber.

The pump of the invention comprises a pump cylinder 20 which is desirably conveniently supported in an end recess 21 of housing 22. The cylinder is desirably of circular interior cross section and receives pump plunger 23 packed by stuffing box 24 in housing well 25 to which access is had by removing cover 26. The plunger at its rearward end is engaged by crosshead 27 which reciprocates in suitably cylindrical crosshead guides 28 of the housing under the action of connecting rod 30 pivotally connected in a slot of the crosshead at 31.

Figures 1, 1A:
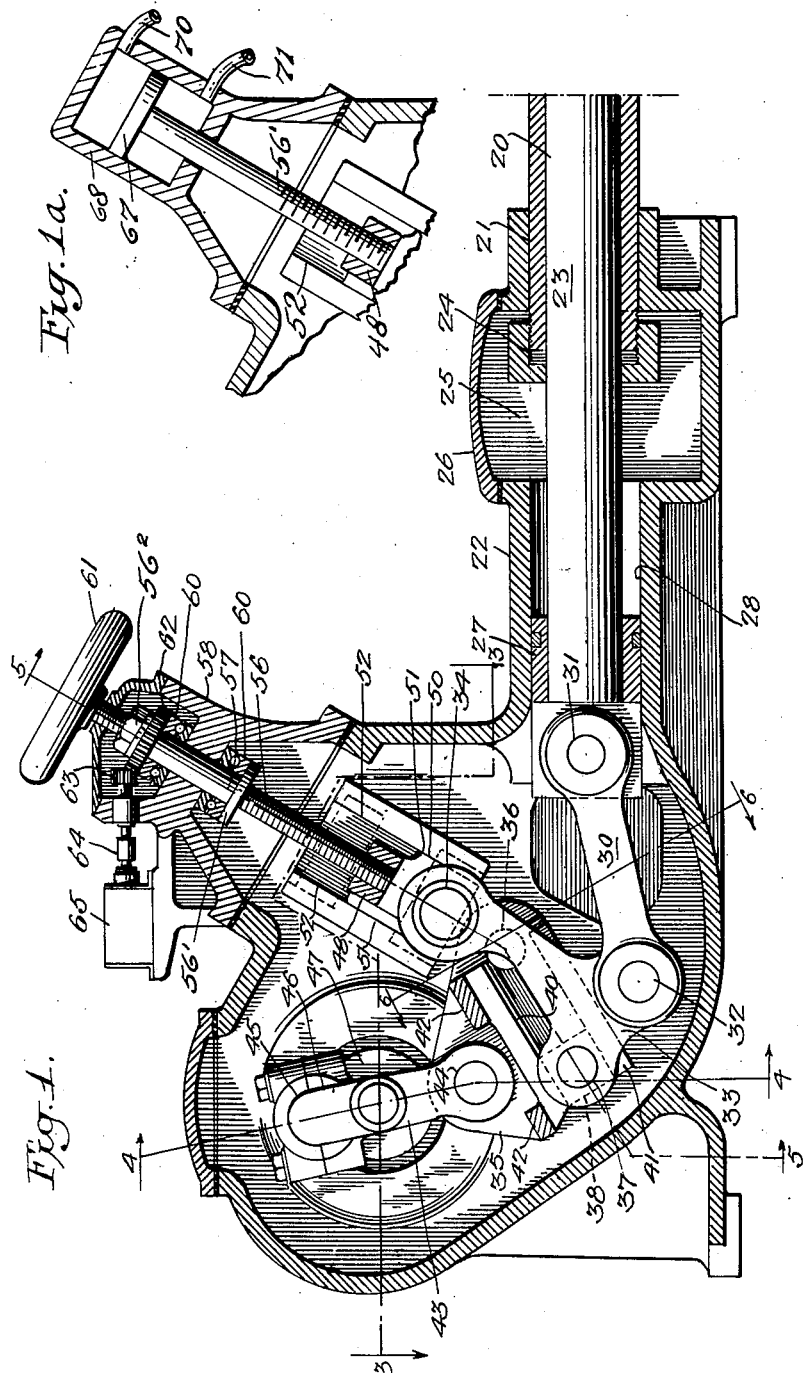
Figure 8:
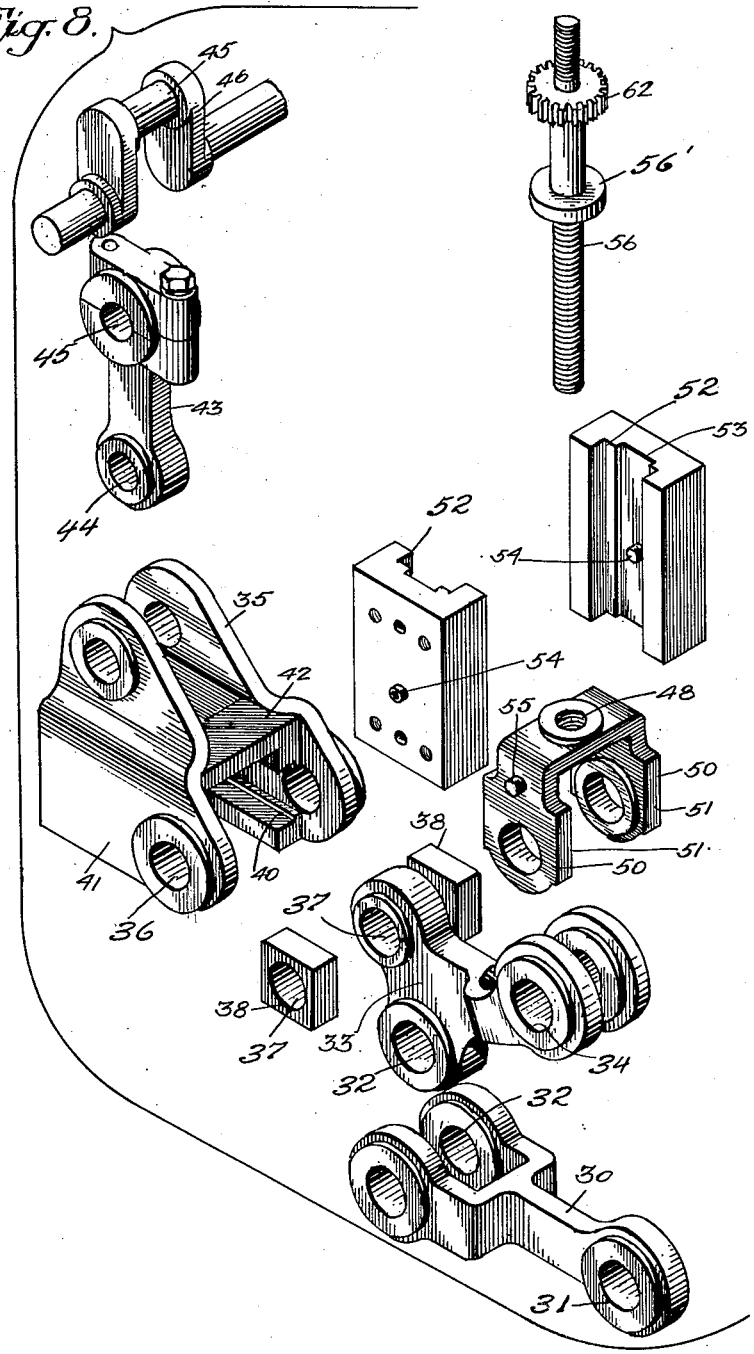
Figure 8 is an exploded perspective of the operating components of the drive and adjustment mechanism.

The connecting rod 30 at the end remote from the pump plunger is pivotally connected at 32 by forked ends to adjustment rocker 33, which rocks around pivot 34 as well seen in Figure 1. Pivot 34 is the adjustment pivot which is moved linearly for the purpose of adjustment as later explained, but which once adjusted remains in the particular adjustment position and provides pivotal support for adjustment rocker 33.

The adjustment rocker 33 is swung back and forth by adjustment block 35 which is mounted on non-adjustable fixed pivot 36 and is interconnected with adjustment rocker 33 by movable pivot 37. Fixed pivot 36 is accomplished by pins extending in from the opposite sides of the housing on the same axis to the opposite sides of the adjustment block. The movable pivot 37 carries sliding blocks 38 at opposite sides of adjustment rocker 33 which are guided toward and away from fixed pivot 36 by guideways 40 at opposite sides of a yoke portion 41 of adjustment block 35. The two yoke portions are cross connected by webs 42 on the adjustment block, permitting the adjustment rocker to be pivoted at 37 between the two sides of the adjustment block.

Swinging motion is imparted to the adjustment block about its fixed pivot 36 by connecting rod 43 pivotally connected at 44 to the adjustment block and pivotally connected at 45 at its opposite end to driving crank 46, which turns in bearings 47 in the housing. It will be understood that the driving crank 46 will be driven in any suitable manner, for example by an electric motor and gear reduction not shown, turning continuously in the same direction which is desirably counterclockwise in Figure 1, in order to minimize the wear by providing a higher component of pressure on the piston in the compression stroke.

The variation in stroke is accomplished by varying the position of adjustment pivot 34 of adjustment rocker 33 toward and away from fixed pivot 36 of adjustment block 35. This is accomplished by any suitable linear adjustment mechanism, since no swinging action of the adjustment pivot 34 is required. In the form shown, adjustment pivot 34 is mounted on nut 48 having yoke arms 50 which mount the adjustment pivot. The sides of the yoke arms form guiding surfaces 51 which engage at both sides of each yoke arm in longitudinally extending guideways 52 mounted in opposite sides of the housing. The guideways extend parallel to the line of centers of fixed pivot 36 and adjustment pivot 34. The guideways have central longitudinal recesses 53 which contain inwardly extending stops 54 which engage cooperating stops 55 on the yoke arms to prevent adjustment beyond full stroke (Figure 5).

The nut 48 makes threaded engagement with adjustment screw 56 journalling at 57 in a cap 58 of the housing and provided with thrust bearings 60 at the top and bottom of the journal. A boss 56' on the screw engages the lower thrust bearing and a nut 56² engages the gear above the upper thrust bearing. Pivot 34 is transversely bored at 34' to pass the end of the screw. The nut can be manipulated in any suitable way. It is not considered necessary to show the detail of well known remote control in the present structure, and hand wheel 61 is illustrated to indicate that any desired manner of manipulation of the adjustment may be employed.

In order to provide a numerical indication of changes in adjustment, screw 56 is provided with spur gear 62 which meshes with pinion 63 connecting through coupling 64 to a suitable revolution counter 65.

The manner of accomplishing the adjustment will be better understood by reference to the diagrammatic views. Figure 9 illustrates the components already described in the full stroke adjustment and in the discharge position. It will be understood that connecting rod pivot 31 which pivotally connects connecting rod 30 to the crosshead is at a limiting position at the end of the stroke which closely corresponds to the limiting position 66' shown in Figure 10 for half stroke and 66² shown in Figure 11 for zero stroke, the variation being small enough to be regarded as negligible for many applications.

The manner of accomplishing the adjustment and the relations of the parts will be better understood by reference to Figures 12 to 16 inclusive.

Figures 12 and 13 show the full stroke adjustment position respectively for the beginning of the compression stroke and the discharge end of the compression stroke respectively.

The line AB between the center of the fixed pivot 36 of the adjustment block 35 and the center of the adjustment pivot 34 is a fixed reference line, which does not change direction nor move to the side, as the adjustment pivot 34 moves toward or away from the fixed pivot 36 during adjustment. The crank 46 and connecting rod 43 throws the sliding pivot 37 between the adjustment rocker 33 and the adjustment block 35 to the same distance on opposite sides of the prolongation of the line AB, so that AB is the mid-line between the position of the sliding pivot 37 at the beginning of the compression stroke in Figure 12, and the position of the sliding pivot 37 at the end of the compression stroke in Figure 13. In other words, angle $a$ in Figure 12 equals angle $a$ in Figure 13, the angle in both cases being between the prolongation of midline AB and the line of centers between fixed pivot 36 and sliding pivot 37 which is the center line of guides 40 on which the center of fixed pivot 36 lies. Similarly the line of centers between the adjustment pivot 34 and the sliding pivot 37 swings as far to one side of the midline AB at the beginning of the discharge stroke in Figure 12 as it swings to the opposite side of the end of the discharge stroke in Figure 13. In other words the angle $b$ between the line of centers 34 to 37 and mid-line AB in Figure 12 equals the similar angle $b$ in Figure 13.

At the end of the stroke in Figure 13, the line BC between the fixed pivot 36 and movable pivot 37 is substantially at right angles to the prolongation of the plunger axis, or angle $c$ is a right angle.

The relations just described for full stroke in Figures 12 and 13 also exist for half stroke in Figures 14 and 15, where Figure 14 shows the condition for the beginning of the compression stroke and Figure 15 shows the condition for the end of the compression stroke. Thus angle $a$ in Figure 14 equals angle $a$ in Figure 15, and angle $b$ in Figure 14 equals angle $b$ in Figure 15, although angle $b$ is not the same at half stroke as at full stroke. Angle $a$ remains the same for any other percentage of stroke, and the same relations exist, down to zero stroke. In Figure 15 angle $c$ is substantially a right angle.

At zero stroke, the centers of fixed pivot 36 and sliding pivot 37 coincide as in Figure 16, and there is no throw whatever on the crosshead pivot 31 and the adjustment rocker 33 when the adjustment block swings back and forth. In this case angle $b$ is zero or ceases to exist.

Figure 17 is a composite for the various views, featuring especially the condition for the end of the compression stroke. This shows that the positions 66, 66' and 66² for the end of the compression stroke respectively on full stroke, half stroke and zero stroke are very close together, and little error exists due to difference in compressibility of the liquid. This shows that angle $c$ is a right angle and the sliding pivot positions all be substantially on the line BC.

Certain of the features which contribute to the success of the design will be readily observed from the diagrammatic views.

The crosshead really acts as an extension of the plunger to make the pivotal connection from the plunger to the connecting rod 30 at 31.

The adjustment pivot 34 is located to one side of the line of the connecting rod pivots while the fixed pivot 36 of the adjustment block is located nearer the line of centers of the connecting rod and nearer the axis of the plunger. The fixed pivot 36 of the adjustment block is located on the line of adjustment of the adjustment pivot 34, or, which amounts to the same thing, the adjustment pivot 34 is adjusted along the line of centers between the fixed pivot 36 of the adjustment block and the adjustment pivot 34.

The sliding pivot 37 pivotally connects the adjustment rocker at a point fixed on the adjustment rocker with a slidable point on the adjustment block. The pivot 37 is very desirably located at a point remote from the adjustment pivot and adjoining the pivotal connection 32 of the connecting rod 20 with the adjustment rocker 33 on the side of the adjustment rocker remote from the connecting rod 30. The sliding pivot 37 is adjustable along the line of centers between the fixed pivot 36 of the adjustment block and the sliding pivot 37, and in the zero stroke position the two actually coincide.

The adjustment block is swung back and forth equally on opposite sides of the line of centers between the adjustment pivot 34 and the fixed pivot 36 of the adjustment block.

In the preferred embodiment, the sliding pivot 37 is made as close to the pivotal connection 32 as can be done conveniently without complicating the mechanism.

In operation, the pump is started by driving the crank shaft 45 desirably always in the direction indicated. It is not necessary to make the adjustment before starting the pump. The stroke can be reduced or increased, assuming that the initial seating is an intermediate seating, by adjusting the control mechanism which need not always be a remote control system but may in many instances merely be the hand wheel 61. Since the counter indicates the number of turns added to or subtracted from the setting of the screw 56, the counter reading at any time coordinates with the setting, and the piston stroke can be very accurately set by reading the counter.

As the position of the adjustment pivot 34 is moved diagonally upward in Figure 1, the position of the sliding pivot 37 moves closer and closer to the fixed pivot 36 of the adjustment block, and the stroke is shortened, until when the sliding pivot 37 and the fixed pivot 36 coincide the plunger has zero stroke or remains stationary while the crank continues to operate.

For any given adjustment, the adjustment block swings back and forth through the same range, always swinging equally on the opposite sides of the line of adjustment AB. The sliding pivot 37 at the end of the stroke always is on the line BC perpendicular to the plunger axis.

With the various adjustments, the end of the compression stroke is substantially always at the same position, except for the slight variation noted in Figures 9, 10 and 11, and the change in stroke is accomplished substantially entirely by changing the initial stroke position. This is very desirable as avoiding errors in pumping liquids which are somewhat compressible.

While in Figure 1 I show a rotary adjustment, I can use a reciprocating adjustment as shown in Figure 1ª. Instead of the screw 56, a piston rod 56' moves the adjustment pivot 34. A piston 67 on the rod reciprocates on the cylinder 68 under the pressure of fluid admitted to opposite ends of the cylinder through hose connections 70 and 71. By controlling the volume of a fluid such as oil pumped in or discharged through connections 70 and 71, the piston 68 can be held in any desired adjusted position by remote control.

It will be evident by the present invention that it is possible to accomplish a comparatively simple stroke adjustment which bears a linear relation between the change of stroke and the change in adjustment, one inch in adjustment accomplishing approximately one inch in change of stroke.

It will further be evident that the plunger of the invention comes to the substantially same position at the end of the compression stroke for any adjustment.

In view of my invention and disclosure variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. In a stroke control pump mechanism, a reciprocable pump plunger, a connecting rod pivotally connected at one end to the plunger, an adjustment block pivotally connected to the opposite end of the connecting rod, an adjustment pivot pivoting the adjustment rocker to one side of the axis of the plunger, an adjustment block swingable back and forth, a fixed pivot for the adjustment block, a slidable pivot slidable in the adjustment block pivotally connecting the adjustment rocker with the adjustment block and adjustable along the line of centers between the sliding pivot and the fixed pivot of the adjustment block toward and away from said fixed pivot, means for swinging the adjustment block back and forth equally on opposite sides of the line of centers between the adjustment pivot and the fixed pivot of the adjustment block, the slidable pivot at the end of the stroke always being substantially on the same line transverse to the plunger axis for all adjustments and means for adjusting the adjustment pivot along the line of centers between the adjustment pivot and the fixed pivot of the adjustment block toward and away from the adjustment block.

2. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker to one side of the axis of the plunger, an adjustment block swingable back and forth, a fixed pivot for the adjustment block, a slidable pivot slidable in the adjustment block pivotally connecting the adjustment rocker with the adjustment block and adjustable along the line of centers between the sliding pivot and the fixed pivot of the adjustment block toward and away from said fixed pivot, means for swinging the adjustment block back and forth equally on opposite sides of the line of centers between the adjustment pivot and the fixed pivot of the adjustment block and means for adjusting the adjustment pivot along the line of centers between the adjustment pivot and the fixed pivot of the adjustment block toward and away from the adjustment block while restraining the adjustment pivot against motion in any other direction than the line of adjustment.

3. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker and located to one side of the line of the connecting rod pivots, an adjustment block swingable back and forth, a fixed pivot for the adjustment block located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker, and adjustable along the line of centers between the sliding pivot and the fixed pivot of the adjustment block toward and away from said fixed pivot, means for swinging the adjustment block back and forth equally on opposite sides of the line of centers between the adjustment pivot and the fixed pivot of the adjustment block, guides for controlling the adjustment of the adjustment pivot along the line of centers between the adjustment pivot and the fixed pivot of the adjustment block toward and away from the adjustment block and mechanism for moving the adjustment pivot toward and away from the fixed pivot of the adjustment block in the guides.

4. In a stroke control pump mechanism, a reciprocable pump plunger, a connecting rod pivotally connected at one end to the plunger, an adjustment rocker pivotally connected to the opposite end of the connecting rod, and adjustment pivot pivoting the adjustment rocker and located to one side of the line of the connecting rod pivots, an adjustment block swingable back and forth, a fixed pivot for the adjustment block located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker, and adjustable along the line of centers between the sliding pivot and the fixed pivot of the adjustment block toward and away from said fixed pivot, means for swinging the adjustment block back and forth equally on opposite sides of the line of centers between the adjustment pivot and the fixed pivot of the adjustment block, the slidable pivot at the end of the stroke always being substantially on the same line transverse to the plunger axis for all adjustments, guides for controlling the adjustment of the adjustment pivot along the line of centers between the adjustment pivot and the fixed pivot of the adjustment block toward and away from the adjustment block and mechanism for moving the adjustment pivot toward and away from the fixed pivot of the adjustment block in the guides.

5. In a stroke control pump mechanism, a reciprocable pump plunger, a connecting rod pivotally connected at one end to the plunger, an adjustment rocker pivotally connected to the opposite end of the connecting rod, and adjustment pivot pivoting the adjustment rocker and located to one side of the line of the connecting rod pivots, an adjustment block swingable back and forth, a fixed pivot for the adjustment block located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker, and adjustable along the line of centers between the sliding pivot and the fixed pivot of the adjustment block toward and away from said fixed pivot, means for swinging the adjustment block back and forth equally on opposite sides of the line of centers between the adjustment pivot and the fixed pivot of the adjustment block, guides for controlling the adjustment of the adjustment pivot along the line of centers between the adjustment pivot and the fixed pivot of the adjustment block toward and away from the adjustment block, the guides limiting the adjustment pivot motion entirely to the line of adjustment, and mechanism for moving the adjustment pivot toward and away from the fixed pivot of the adjustment block in the guides.

6. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker and located to one side of the line of the connecting rod pivots, an adjustment block swingable back and forth, a fixed pivot for the adjustment block, located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker on the side of the adjustment rocker remote from the connecting rod and adjustable along the line of centers between the sliding pivot and the fixed pivot of the adjustment block toward and away from said fixed pivot and to a position coinciding with said fixed pivot, means for swinging the adjustment block back and forth equally on opposite sides of the line of centers between the adjustment pivot and the fixed pivot of the adjustment block and means for adjusting the adjustment pivot along the line of centers between the adjustment pivot and the fixed pivot of the adjustment block toward and away from the adjustment block.

7. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker and located to one side of the line of the connecting rod pivots, an adjustment block swingable back and forth, a fixed pivot for the adjustment block, located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker on the side of the adjustment rocker remote from the connecting rod and adjustable along the line of centers between the sliding pivot and the fixed pivot of the adjustment block toward and away from said fixed pivot and to a position coinciding with said fixed pivot, means for swinging the adjustment block back and forth equally on opposite sides of the line of centers between the adjustment pivot and the fixed pivot of the adjustment block, the slidable pivot at the end of the stroke always being substantially on the same line transverse to the plunger axis for all adjustment, and means for adjusting the adjustment pivot along the line of centers between the adjustment pivot and the fixed pivot of the adjustment block toward and away from the adjustment block.

8. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker and located to one side of the line of the connecting rod pivots, an adjustment block swingable back and forth, a fixed pivot for the adjustment block, located nearer the line of centers of the connecting rod than the adjustment pivot, a sliding pivot slidable in the adjustment block pivotally connecting the adjustment rocker at a point remote from the adjustment pivot and adjoining the pivotal connection of the connecting rod and the adjustment rocker on the side of the adjustment rocker remote from the connecting rod and adjustable along the line of centers between the sliding pivot and the fixed pivot of the adjustment block toward and away from said fixed pivot and to a position coinciding with said fixed pivot, means for swinging the adjustment block back and forth equally on opposite sides of the line of centers between the adjustment pivot and the fixed pivot of the adjustment block and means for adjusting the adjustment pivot along the line of centers between the adjustment pivot and the fixed pivot of the adjustment block toward and away from the adjustment block while restraining the adjustment pivot against motion in any other direction than the line of adjustment.

9. In a stroke control pump mechanism, a reciprocable pump plunger, a connecting rod pivotally connected at one end to the plunger, an adjustment rocker pivotally connected to the opposite end of the connecting rod, an adjustment pivot pivoting the adjustment rocker and located to one side of the axis of the plunger, an adjustment block swingable back and forth, a fixed pivot for the adjustment block located nearer the line of centers of the connecting rod than the adjustment pivot, a sliding pivot slidable in the adjustment block pivotally connecting the adjustment rocker with the adjustment block and adjustable along the line of centers between the sliding pivot and the fixed pivot of the adjustment block toward and away from said fixed pivot and to a position coinciding with said fixed pivot, guides for adjusting the adjustment pivot position along the line of centers between the adjustment pivot and the fixed pivot of the adjustment block, a piston connected to the adjustment pivot and a cylinder for the piston for moving the adjustment pivot back and forth in the guides and means for swinging the adjustment block back and forth equally on opposite sides of the line of centers between the adjustment pivot and the fixed pivot of the adjustment block, bringing the sliding pivot always to a position substantially on the same line transverse to the plunger axis for all adjustment positions.

ROYAL BARTLETT SAALFRANK.

References Cited in the file of this patent

UNITED STATES PATENTS

| Number | Name | Date |
|---|---|---|
| 870,630 | Kinsman | Nov. 12, 1907 |
| 1,189,312 | Tibbels | July 4, 1916 |
| 1,922,539 | Groff | Aug. 15, 1933 |
| 2,108,311 | Harris | Feb. 15, 1938 |
| 2,235,631 | Frenkel | Mar. 18, 1941 |
| 2,240,371 | Linch et al. | Apr. 29, 1941 |
| 2,259,587 | Rush | Oct. 21, 1941 |
| 2,548,738 | Orlich et al. | Apr. 10, 1951 |